Jan. 8, 1952   A. T. KOPPE   2,581,591
PRECISION CAMERA
Filed July 27, 1948   2 SHEETS—SHEET 1
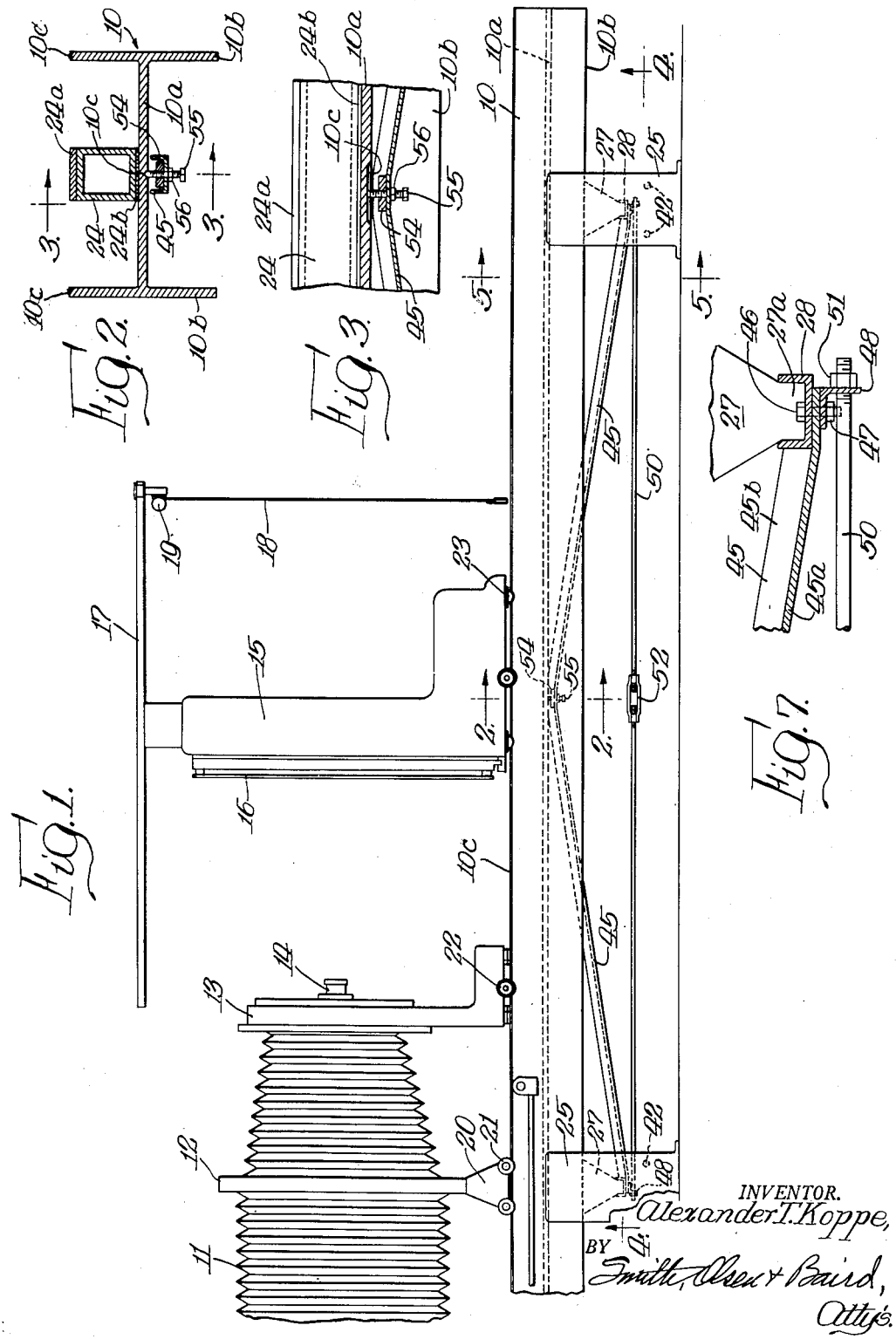
INVENTOR.
Alexander T. Koppe,
BY Smith, Olsen & Baird,
Attys.

Jan. 8, 1952  A. T. KOPPE  2,581,591
PRECISION CAMERA
Filed July 27, 1948  2 SHEETS—SHEET 2
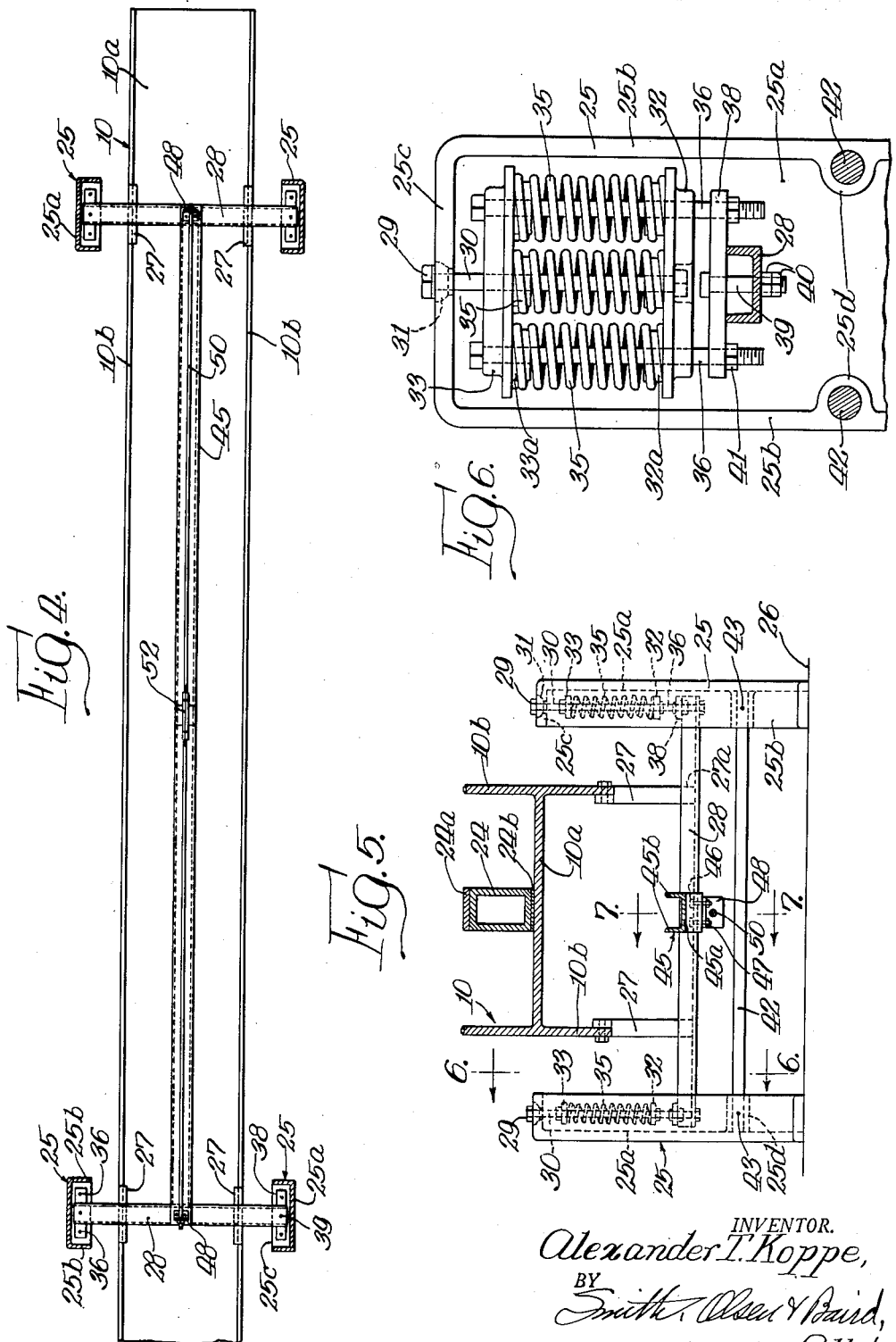
INVENTOR.
Alexander T. Koppe,
BY
Smith, Olsen & Baird,
Attys.

Patented Jan. 8, 1952

2,581,591

UNITED STATES PATENT OFFICE 2,581,591

PRECISION CAMERA

Alexander T. Koppe, Chicago, Ill.

Application July 27, 1948, Serial No. 40,809

7 Claims. (Cl. 88—24)

This invention relates to precision cameras of a type adapted to be employed in lithographic and printing plants where they may be employed with particular advantage for reproducing and effecting the color separation of the various parts of a colored copy or subject which is to be reprinted in various colors with or without enlargement or reduction in size. The purpose of the invention is to provide improved apparatus for photographically reproducing one or more subjects carried by either transparent or opaque sheets, in such a manner that the various subjects will be precisely located in definite positions to insure an exact registry thereof with each other in size, position and relative location of parts.

A camera of this type commonly comprises a horizontal frame or stand arranged to support a copy holder on which the subject is mounted, a lens carrier, and a plate holder in combination with means for effecting the adjustment of these parts and for effecting the relative adjustment thereof on the frame or stand to bring about the desired projection and photography of the subject. Since the frame or stand is commonly of great length and the aforesaid parts supported thereon are of substantial weight, there is danger that the frame or stand may sag slightly under its load when the copy holder and the lens carrier are adjusted thereon. This deflection may vary in degree for different positions of the parts which are adjusted and with different adjustments with the consequence that there is a lack of the required accuracy in the registry of the several parts of the composite subject in the finished product.

The principal object of the present invention is to provide a camera having a frame or stand adapted to retain its original shape without distortion or flexure during use, thereby avoiding inaccuracy from this cause in the registry of the component parts of the subject in the product produced by the printing or lithographic process. A further object is to provide a precision camera having a horizontal frame or stand which is reinforced to prevent flexure thereof during use. Still another object is to provide a precision camera having a frame or stand constructed to resist flexure by the action of gravity during use, in combination with means for supporting the stand so that it will not be influenced by vibrations received from external sources. Other objects relate to various features of construction and arrangement which will appear more fully hereinafter.

The nature of the invention will be understood from the following specification taken with the accompanying drawings in which one embodiment is illustrated. In the drawings, Figure 1 shows a side elevation of the major portion of a precision camera illustrating, somewhat diagrammatically, certain parts of the photographic apparatus and showing the application of one embodiment of the features of the present invention;

Fig. 2 shows an enlarged transverse section taken on the line 2—2 of Fig. 1;

Fig. 3 shows an enlarged vertical longitudinal section taken on the line 3—3 of Fig. 2;

Fig. 4 is a horizontal section taken on the line 4—4 of Fig. 1, looking in the direction of the arrows, illustrating a bottom plan view of the camera stand or frame and the truss structure associated therewith;

Fig. 5 shows a vertical section taken on the line 5—5 of Fig. 1;

Fig. 6 shows a vertical section taken on the line 6—6 of Fig. 5; and

Fig. 7 shows an enlarged vertical section taken on the line 7—7 of Fig. 5.

As illustrated in the drawings, the invention is embodied in a precision camera comprising a horizontal camera stand or frame 10 which is in the form of a large H-beam having its web 10a extending horizontally and having its flanges 10b extending vertically. The top edges of the vertical flanges 10b of the camera stand 10 constitute parallel tracks upon which are mounted for relative movement the principal parts of the photographic apparatus including a negative plate holder and screen housing, not illustrated, which are mounted within a dark room having an aperture to which the bellows 11 is connected. The intermediate part of this bellows is carried by a bellows support 12 and the forward end thereof is connected to the lens carrier 13 having mounted thereon the lens 14. On an intermediate part of the camera stand 10, there is mounted the copyboard carrier 15 comprising a rectangular frame upon which is mounted the copy or subject 16 to be reproduced. The carrier 15 has mounted on the upper part thereof a horizontal frame 17 from which is suspended a curtain 18 carried by a roller 19 on which the curtain may be rolled when it is not in use. When desired, this curtain may be drawn downwardly as shown in Fig. 1 to shut off light from the rear of the copyboard holder.

The bellows support, the lens carrier, and the copyboard holder are mounted for relative movement upon the camera stand 10. For this purpose, the bellows support 12 is carried by a truck 20 having rollers 21 which travel upon the top flanges 10b of the camera stand. The lens carrier 13 is provided with three supporting rollers 22, two of which travel upon one of the flanges 10b while the other travels upon the other flange 10b, thus giving the lens carrier a three point support upon the camera stand so that it occupies a stable position at all times. This arrangement permits the lens to be adjusted to various positions with respect to the negative plate holder which adjustment is accommodated by the collapsible bellows 11. The copyboard holder 15 has an enlarged base upon which are mounted three supporting rollers 23, one of which is arranged to travel upon one of the flanges 10b of the camera stand, while the other two travel upon the other flange 10b. The curtain 18 is, of course, movable with the copyboard carrier 15. To reduce the wear and to facilitate the travel of the bellows support, the lens carrier and the copyboard holder upon the stand, the top flanges 10b of the stand are preferably provided with flat grooves in which are mounted hard metal tapes 10c. The rollers of the various carriages travel on these tapes during the adjustment of the camera.

Midway between the upwardly extending flanges 10b of the camera stand there is provided a tubular member 24 of rectangular cross section which has secured to the top wall thereof a flat plate 24a which may serve as additional support for the parts of the photographic apparatus between the side flanges of the camera stand, the plate 24a having its top surface at the same level as the top edges of the upper flanges 10b. The tubular member 24 is bolted or otherwise secured to a series of spacing plates 24b which are secured by spot welds to the web 10a of the stand. The relative adjustments of the parts which have just been described are effected by suitable operating mechanism, not illustrated, which may be of the form shown and described in my prior United States Letters Patent No. 1,847,010 dated February 23, 1932.

The camera stand 10 and the photographic apparatus carried thereby are supported by hollow supporting frames or pedestals 25, mounted upon the floor or other support 26, in such a manner that the vibrations within the building arising from the operation of machinery or other causes are not transmitted to the camera stand 10 and the parts carried thereby, thus permitting the accurate photography of the subject without influence by these vibrations. The connection between the camera stand 10 and the pedestals 25 comprises four legs 27, preferably having the contour shown in Figs. 1 and 7, which are bolted to the bottom edges of the lower flanges 10b of the camera stand and which extend downwardly with their lower extremities 27a, which are of rectangular formation, fitting within the vertical flanges of the transverse supporting bars 28. These bars are of channel form with their flanges directed upwardly and each flange receives the portions 27a of two of the legs 27 to which they are secured by welding or the like. The bars 28 extend laterally beyond the legs 27, as shown particularly in Figs. 4 and 5, and they terminate adjacent to the vertical webs 25a of the pedestals and within the outer side flanges 25b and the top flanges 25c of these pedestals. The bars 28 are suspended from the top flange 25c of the pedestal 25 by a spring mechanism which is the same at each end of each bar 28. Each mechanism comprises a bolt 30 engaging an aperture in the top flange 25c of the associated pedestal 25 and mounted for oscillatory movement therein by means of a washer 31 having a rounded annular surface which conforms to the corresponding surface of a portion of the aperture in the flange. Each bolt is engaged at its top end by a nut 29 and the lower end portion thereof passes through a spring retainer 32 supported by the head of the bolt. The upper part of the bolt extends through a central aperture in another spring retainer 33. These spring retainers are provided with projections 32a and 33a arranged to be engaged by the ends of three coil springs 35. The middle one of these springs is mounted around the bolt 30 and the other two springs are mounted around other bolts 36 which engage apertures in the upper spring retaining member 33 with their heads resting upon the upper surface of the member 33. The lower parts of these bolts 36 pass through apertures in the lower spring retaining member 32 and through other apertures formed in a transverse bracket 38 which is secured to one end of a supporting bar 28 by means of a bolt 39 and nuts 40. The lower threaded ends of the bolts 36 are engaged by nuts 41 so that the adjacent end of the bar 28 is thereby suspended from the adjacent pedestal 25 through the intermediate springs 35. It will be seen that any downward movement of the end of the bar 28 will cause a compression of the springs 35 while the lower spring retaining member 32 retains a fixed position with respect to the associated pedestal. By this arrangement, both ends of each bar 28 are suspended from two of the pedestals 25 in a manner which is adpated to eliminate or reduce to a minimum the vibrations which are transmitted from the floor 28 to the camera stand 10. To increase the rigidity of the supporting structure, the opposite pedestals 25 are connected by transverse rods 42 which are secured by pins 43 in the bosses 25d which are formed on the lower parts of the flanges 25b of the pedestals, there being two such rods 42 for each pair of pedestals.

In order to eliminate any tendency to a downward flexure of the camera stand 10 during use and the inaccuracy in the photography of the subject which would result if the top edges of the upper flanges 10b of the camera stand occupy different positions with different adjustments of the parts of the photographic apparatus and during the photography of different parts of the composite subject, the camera stand 10 is reinforced by a truss structure mounted on the underside thereof and comprising a channel bar 45 formed preferably as one integral member made up of two upwardly converging parts. The bar 45 is preferably formed as a channel shaped member having a bottom wall 45a and upwardly extending flanges 45b. At its ends, the bar 45 has its side flanges 45b cut away and the bottom flanges 45a thereof are extended beneath the transverse supporting bars 28 of the camera stand, as shown particularly in Figs. 1 and 7. These projecting portions of the walls 45a of the bar 45 are secured to the middle points of the bars 28 by bolts 46 and nuts 47. The bolts 46 also secure in place the angle-shaped brackets 48 and these brackets are connected to each other by a tie rod 50 which extends through apertures in the brackets and is engaged on its threaded ends by nuts 51. The tie rod 50 is divided into two sections which are connected at an intermediate point by a turnbuckle 52 engaging threaded parts thereof, whereby the effective length of the tie rod may be regulated.

The apex or top point of the bar 45 has the bottom wall thereof reinforced by a block 54 which is welded or otherwise secured thereto as shown particularly in Figs. 2 and 3. This block and the bottom wall of the bar 45 are threadedly engaged by a setscrew 55 which may be secured in adjusted position by a lock nut 56. The setscrew 55 extends upwardly and contacts the underside of the web 10a of the camera stand which is preferably provided with a groove 10c at this point to receive the end of the setscrew to prevent lateral movement thereof.

It will be apparent that by adjusting the setscrew 55 and the turnbuckle 52 the truss structure formed by the bar 45 and the tie rod 50 and associated parts may be adjusted in order to provide adequate support for the intermediate part of the camera stand 10, whereby the top edges of the upper flanges 10b of the camera stand 10 will be maintained at all times in a horizontal plane regardless of the relative adjustments on the camera stand of the different parts of the photographic apparatus.

Although one form of the invention has been shown and described by way of illustration, it will be understood that it may be constructed in various other embodiments which come within the scope of the appended claims.

I claim:

1. The combination in a camera, of a horizontal camera stand in the form of an H-beam having its web extending horizontally and its flanges directed vertically, photographic apparatus adjustable from one position to another longitudinally on the upwardly directed flanges, and a truss structure connected to the lower flanges of said H-beam toward the ends of said stand, said truss structure having means intermediately disposed thereon adjustably bearing upon an intermediate portion of said stand for maintaining in horizontal positions the flanges on which said photographic apparatus is mounted.

2. The combination in a camera, of a horizontal camera stand in the form of an H-beam having its web extending horizontally and its flanges directed vertically, photographic apparatus adjustable from one position to another longitudinally on the upwardly directed flanges, legs connected to the downwardly directed flanges of said H-beam at spaced points, said legs being located opposite each other in pairs, a transverse bar connected to the lower ends of each pair of legs, means connected to said bars for supporting said stand, and a truss structure extending between said transverse bars and having an intermediate portion so constructed and arranged as to bear upon an intermediate part of said H-beam.

3. The combination in a camera, of a horizontal camera stand in the form of an H-beam having its web extending horizontally and its flanges directed vertically, photographic apparatus adjustable from one position to another longitudinally on the upwardly directed flanges, legs connected to the downwardly directed flanges of said H-beam at spaced points, said legs being located opposite each other in pairs, a transverse bar connected to the lower ends of each pair of legs, means connected to said bars for supporting said stand, a truss bar having an intermediate part located in proximity to said web of said H-beam and having end portions diverging downwardly and connected at their ends to intermediate parts of said transverse bars, and means on said intermediate part of said truss bar adjustably bearing upon said web.

4. The combination in a camera, of a horizontal camera stand in the form of an H-beam having its web extending horizontally and its flanges directed vertically, photographic apparatus adjustable from one position to another longitudinally on the upwardly directed flanges, legs connected to the downwardly directed flanges of said H-beam at spaced points, said legs being located opposite each other in pairs, a transverse bar connected to the lower ends of each pair of legs, means connected to said bars for supporting said stand, a truss bar having an intermediate part located in proximity to said web of said H-beam and having end portions diverging downwardly and connected at their ends to intermediate parts of said transverse bars, means on said intermediate part of said truss bar adjustably bearing upon said web, and an adjustable tie rod connecting said transverse bars.

5. The combination in a camera, of a horizontal camera stand in the form of an H-beam having its web extending horizontally and its flanges directed vertically, photographic apparatus adjustable from one position to another longitudinally on the upwardly directed flanges, legs connected to the downwardly directed flanges of said H-beam at spaced points, said legs being located opposite each other in pairs, a transverse bar connected to the lower ends of each pair of legs, means connected to said bars for supporting said stand, a truss structure extending between said transverse bars and having an intermediate portion so constructed and arranged as to bear upon an intermediate part of said H-beam, and means connected to the ends of said transverse bars for resiliently supporting said stand.

6. The combination in a camera, of a horizontal camera stand in the form of an H-beam having its web extending horizontally and its flanges directed vertically, photographic apparatus adjustable from one position to another longitudinally on the upwardly directed flanges, legs connected to the downwardly directed flanges of said H-beam at spaced points, said legs being located opposite each other in pairs, a transverse bar connected to the lower ends of each pair of legs, means connected to said bars for supporting said stand, a truss structure extending between said transverse bars and having an intermediate portion so constructed and arranged as to bear upon an intermediate part of said H-beam, four pedestals mounted on a fixed base, and means for resiliently supporting the ends of said transverse bars on said pedestals.

7. The combination in a camera, of a horizontal camera stand in the form of an H-beam having its web extending horizontally and its flanges directed vertically, a hard metal tape longitudinally recessed in the upper edge of each of said flanges, photographic apparatus adjustable on said tapes, spaced supports for said stand, a truss bar having an intermediate part positioned beneath an intermediate part of said stand and having downwardly diverging arms connected to said supports, and a setscrew engaging said intermediate part of said truss bar and bearing on said stand for correcting any sag which may occur in said stand.

ALEXANDER T. KOPPE.

REFERENCES CITED

The following references are of record in the file of this patent:

UNITED STATES PATENTS

| Number | Name | Date |
|---|---|---|
| 230,933 | Fryer | Aug. 10, 1880 |
| 1,607,754 | Hoh | Nov. 23, 1926 |